(12) United States Patent
Tran et al.

(10) Patent No.: US 12,507,245 B2
(45) Date of Patent: *Dec. 23, 2025

(54) INTELLIGENT DUAL-CONNECTIVITY IN 5G NON-STANDALONE MODE

(71) Applicant: AT&T Intellectual Property I, L.P., Atlanta, GA (US)

(72) Inventors: Xuan Tuyen Tran, Piscataway, NJ (US); Matti Hiltunen, Morristown, NJ (US); Slawomir Stawiarski, Carpentersville, IL (US); Yu Zhou, Somerset, NJ (US); Gueyoung Jung, Belle Mead, NJ (US); Rittwik Jana, Montville, NJ (US); Kaustubh Joshi, Short Hills, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 371 days.

This patent is subject to a terminal disclaimer.

(21) Appl. No.: 18/180,560

(22) Filed: Mar. 8, 2023

(65) Prior Publication Data
US 2023/0224773 A1 Jul. 13, 2023

Related U.S. Application Data

(63) Continuation of application No. 17/097,431, filed on Nov. 13, 2020, now Pat. No. 11,627,503.

(51) Int. Cl.
*H04W 72/23* (2023.01)
*H04W 36/00* (2009.01)

(52) U.S. Cl.
CPC ..... *H04W 72/23* (2023.01); *H04W 36/00698* (2023.05)

(58) Field of Classification Search
None
See application file for complete search history.

(56) References Cited

U.S. PATENT DOCUMENTS

| 11,206,604 B1 | 12/2021 | Marupaduga et al. |
| 11,627,503 B2* | 4/2023 | Tran ........................ H04L 5/001 370/331 |
| 2022/0030649 A1 | 1/2022 | Popescu et al. |

OTHER PUBLICATIONS

Non-Final Office Action received for U.S. Appl. No. 17/097,431, dated Aug. 10, 2022, 25 pages.
Notice of Allowance received for U.S. Appl. No. 17/097,431 dated Dec. 9, 2022, 25 pages.
U.S. Appl. No. 16/890,631, filed Jun. 2, 2020.

* cited by examiner

*Primary Examiner* — Diane L Lo
(74) *Attorney, Agent, or Firm* — Guntin & Gust, PLC; John G. Rauch

(57) ABSTRACT

The described technology is generally directed towards intelligent dual-connectivity for non-standalone network nodes. Network nodes can report state information to a central controller, such as a radio access network intelligent controller. The controller can determine, based on the state information reported by multiple network nodes, network nodes to cooperate in non-standalone mode. The controller can provide the network nodes with instructions to implement the controller's non-standalone relationship determinations.

20 Claims, 8 Drawing Sheets

INTELLIGENT DUAL-CONNECTIVITY IN 5G NON-STANDALONE MODE

RELATED APPLICATION

The subject patent application is a continuation of, and claims priority to, U.S. patent application Ser. No. 17/097,431, filed Nov. 13, 2020, and entitled "INTELLIGENT DUAL-CONNECTIVITY IN 5G NON-STANDALONE MODE," the entirety of which priority application is hereby incorporated by reference herein.

TECHNICAL FIELD

The subject application is related to fifth generation (5G) and subsequent generation cellular communication systems, e.g., to intelligent dual-connectivity in 5G non-standalone mode.

BACKGROUND

As newer generation cellular communication technologies overtake older generation technologies, there is a period of overlap during which user equipment, such as cellular telephones and other mobile devices, can be configured to communicate using either the older generation or the newer generation technologies. A current example of older generation cellular communication technology is fourth generation (4G) technology. A current example of newer generation cellular communication technology is fifth generation (5G) technology.

Furthermore, in some instances, user equipment can be configured to communicate using the older generation (4G) and the newer generation (5G) technologies simultaneously. Simultaneous use of two different connection types, for example, simultaneous use of a 4G and a 5G connection, is known as dual-mode. User equipment that can connect to both 4G and 5G network nodes is referred to as dual-connectivity user equipment. When a network node, for example, a 5G network node, operates in cooperation with a 4G network node, the 5G network node is said to be operating in "non-standalone" mode. Conversely, a 5G network node which operates independently, without the support of a 4G network node, is said to operate in "standalone" mode.

Generally speaking, when a user equipment is in communication with a 4G network node, and the user equipment is equipped for dual-connectivity, the 4G network node can initiate dual-connectivity in which at least some communications between the user equipment and the cellular communications network are routed through a 5G network node. The 4G network node can select a proximal 5G network node within range of the user equipment, and the 4G network node can request a dual-mode connection with the 5G network node. The 5G network node can accept the request to establish a dual-mode connection in which the user equipment can communicate via the 4G network node and the 5G network node.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
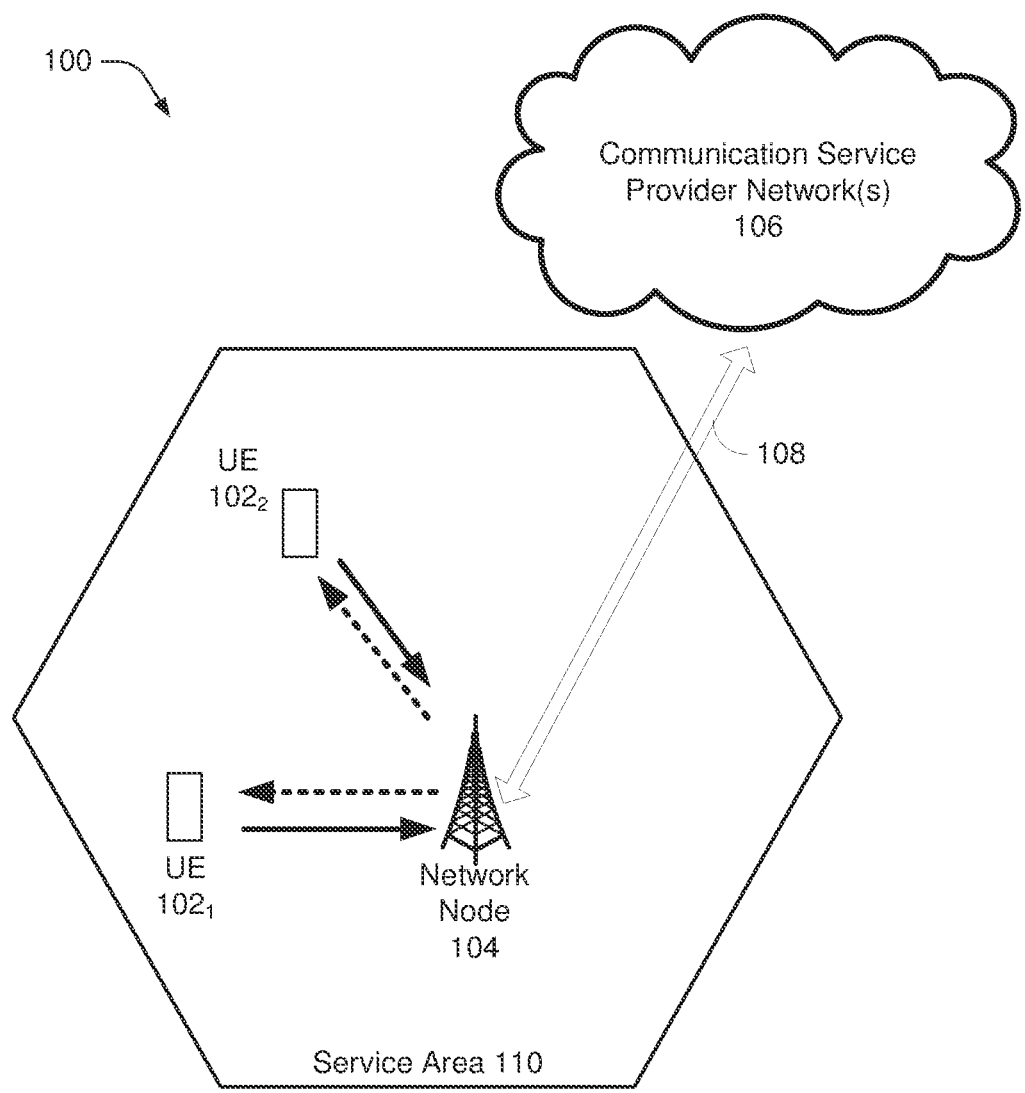
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards intelligent dual-connectivity for non-standalone network nodes. Rather than making dual-connectivity determinations independently, network nodes can report state information to a central controller, such as a radio access network intelligent controller. The controller can intelligently determine, based on the state information reported by multiple network nodes, network nodes to cooperate in non-standalone mode. The controller can provide the network nodes with instructions to implement the controller's intelligent non-standalone relationship determinations.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs $102_1$, $102_2$, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, also called sectors or service areas, such as service area 110, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or comprise a large scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
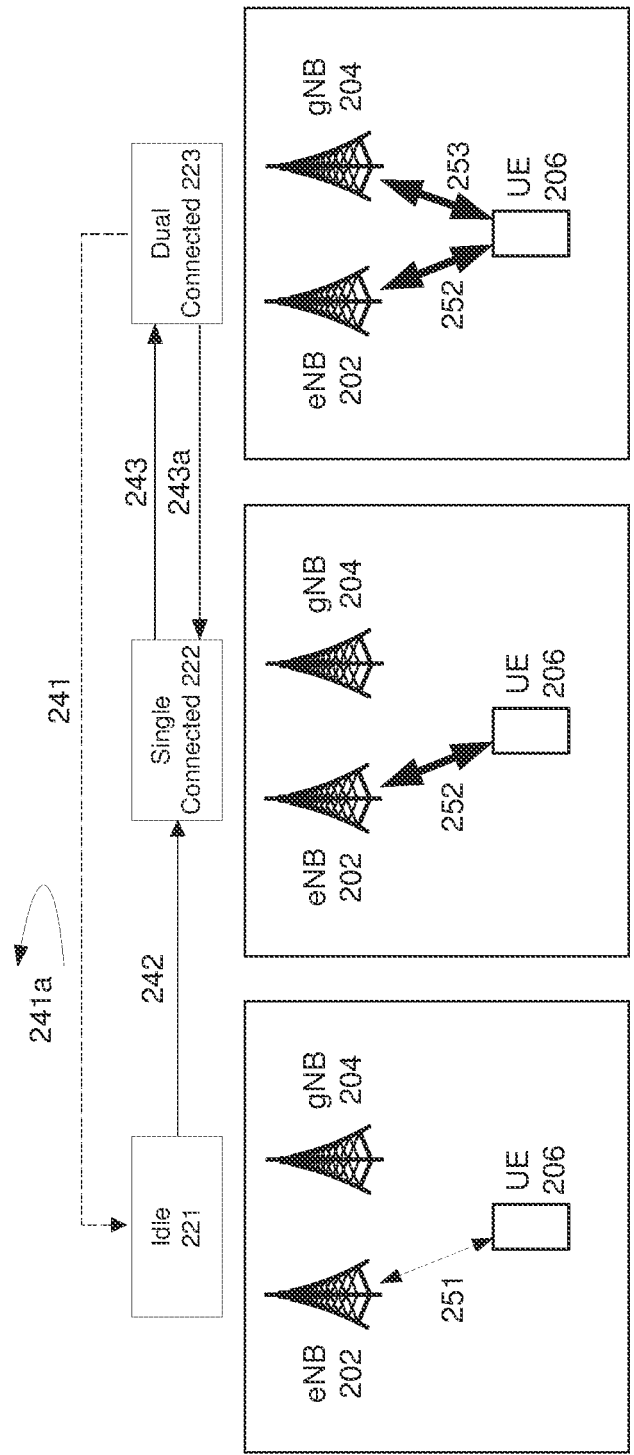
FIG. 2 illustrates example user equipment state transitions between idle, single connected, and dual connected, in accordance with various aspects and embodiments of the subject disclosure.

FIG. 2 illustrates example user equipment state transitions between idle, single connected, and dual connected, in accordance with various aspects and embodiments of the subject disclosure. FIG. 2 illustrates a user equipment (UE) 206 in an idle 221 state, a single connected 222 state, and a dual connected 223 state. The illustrations underneath idle 221, single connected 222, and dual connected 223 illustrate communications of the UE 206 and network nodes eNB 202 and gNB 204 in the various states. The eNB 202 is an example of a first type of network node which is used in 4G type cellular networks. The gNB 204 is an example of a second type of network node which is used in 5G type cellular networks. The arrows 241, 241a, 242, 243, and 243a represent UE 206 and/or network transitions as the UE 206 transitions between idle 221, single connected 222, and dual connected 223.

At transition 241, the UE 206 transitions from dual connected 223 to idle 221, and camps onto the eNB 202. The UE 206 camps on a specific frequency (a carrier frequency) based on instructions in a system information block (SIB) message or a last radio resource control (RRC) connection release message. Within the selected carrier, the UE 206 selects an eNB cell to camp on. The eNB can be selected based on various criteria, for example, the last serving cell eNB cell when the UE was in RRC Connected mode, e.g., eNB 202, can be selected, or a cell with a strongest signal strength on the selected carrier can be selected. In idle 221, the UE 206 can occasionally send/receive idle mode communications 251.

Transition 241a represents a cell reselection, whereby UE 206 remains in idle 221, but camps onto a different eNB. Transition 241a can occur, for example, in response to discovery, at UE 206, of a stronger signal from another eNB, and reselection by UE 206 of its eNB camping cell.

At transition 242, the UE 206 transitions from idle 221 to single connected 222. The UE 206 initiates a connection to the camped eNB 202, and the UE 206 can begin actively sending and receiving communications 252. If the UE 206 is capable of operating in dual mode, and if a gNB (such as gNB 204) is within range of UE 206, then the eNB 202 can attempt to add gNB 204, in order to establish a dual mode connection for UE 206.

In one example approach, which can be enhanced using additional techniques disclosed herein, the eNB 202, referred to as a master eNB, can select a secondary gNB 204, based on a signal strength report from UE 206 which indicates signal strength between UE 206 and gNB 204, as well as, optionally, signal strengths between UE 206 and other gNBs. The eNB 202 can select a secondary gNB associated with a comparatively high, or highest, signal strength. Additional techniques are discussed further with reference to FIGS. 3-9.

The eNB 202 can send a dual-connectivity request to gNB 204. If gNB 204 grants the dual-connectivity request, then the transition 243 can proceed. If gNB 204 declines the dual-connectivity request, then eNB 202 can continue to operate in single connected 222, and the eNB 202 can optionally send subsequent dual-connectivity requests to other gNBs in range of the UE 206.

At transition 243, the UE 206 transitions from single connected 222 to dual connected 223. The UE 206 connects to the gNB 204 and can begin actively sending and receiving communications 253 via gNB 204, in addition to the communications 252 between UE 206 and eNB 202. When both communications 252 and 253 terminate, the UE 206 can transition 241 back to idle 221. When communications 253 terminate before communications 252 (for example when UE 206 goes outside the range of the gNB 204) then UE 206 can transition from dual-connected 223 to single-connected 222, at transition 243a.

Figure 3:
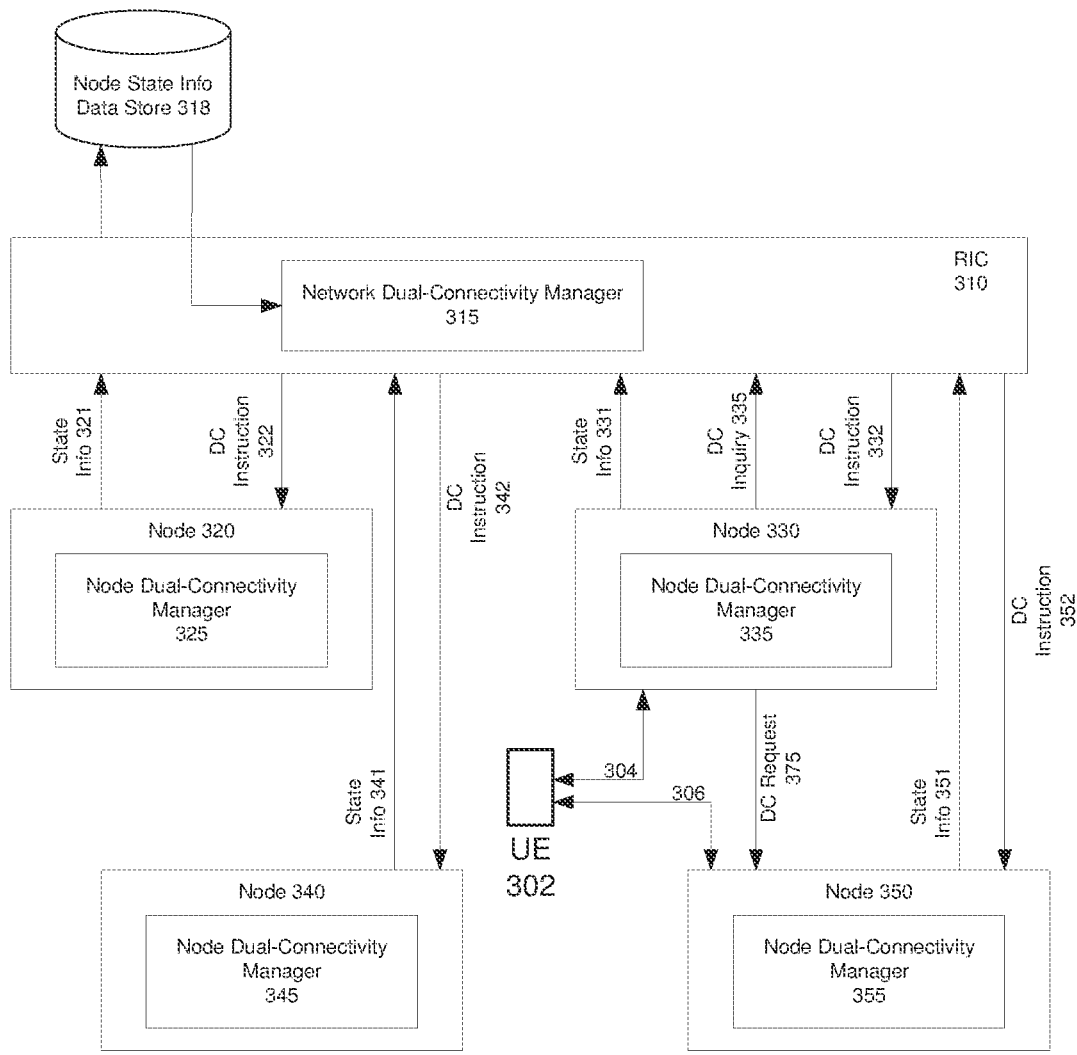
FIG. 3 illustrates example interactions between nodes and a network controller, in accordance with various aspects and embodiments of the subject disclosure.

FIG. 3 illustrates example interactions between nodes and a network controller, in accordance with various aspects and embodiments of the subject disclosure. FIG. 3 includes an example radio access network intelligent controller (RIC) 310 comprising a network dual-connectivity manager 315. The RIC 310 can comprise, or be coupled with, a node state information data store 318. The RIC 310 can furthermore be coupled with multiple network nodes of different types.

The illustrated example network nodes include node 320, node 330, node 340, and node 350. The nodes 320, 330, 340, 350 can be of different types, for example, some of the nodes 320, 330, 340, 350 can be eNBs, or 4G type nodes, and some of the nodes 320, 330, 340, 350 can be gNBs, or 5G type nodes. It should be noted however that other types of nodes are also contemplated, for example, embodiments of this disclosure can also be used in connection with sixth generation (6G) and subsequent generation node types. In many of the examples provided herein based on FIG. 3, nodes 320 and 330 can be eNB nodes, and nodes 340 and 350 can be gNB nodes.

Each of the nodes 320, 330, 340, 350 comprises a node dual-connectivity manager: node 320 comprises node dual-connectivity manager 325, node 330 comprises node dual-connectivity manager 335, node 340 comprises node dual-connectivity manager 345, and node 350 comprises node dual-connectivity manager 355. In an example embodiment, the dual-connectivity managers 325, 335, 345, 355 can be configured to manage dual-connectivity node state reporting as well as the other dual-connectivity related interactions illustrated in FIG. 3.

In accordance with various embodiments according to this disclosure, the nodes 320, 330, 340, 350 can report state information to the RIC 310, and the reported state information can be stored in the node state information data store 318. Thus, for example, node 320 can report state information 321, node 330 can report state information 331, node 340 can report state information 341, and node 350 can report state information 351. State information 321, 331, 341, and 351 can be stored in the node state information data store 318.

State information 321, 331, 341, and 351 can comprise any data that describes node state. In some embodiments, state information 321, 331, 341, and 351 can include load information, indicative of a current load at a corresponding node. Load can be measured in a variety of ways, including, for example, total number of active UE connections, fractions of node communication or processing capabilities which are in use, percentage of physical resource blocks in use (PRB %), or other measurements which directly or indirectly correlate to node load. This disclosure is not limited to any particular load information.

In some embodiments, state information 321, 331, 341, and 351 can include signal strength measurements of signals transmitted between UEs and nodes 320, 330, 340, 350. Other state information can comprise, e.g., interference measurements corresponding to UEs in communication with nodes 320, 330, 340, 350, and UE mobility measurements and estimations corresponding to UEs in communication with nodes 320, 330, 340, 350. This disclosure is not limited to any particular state information, as it is expected that those of skill in the art can use other types of state information with the benefit of this disclosure.

Node states are continually changing, and so nodes 320, 330, 340, 350 can repetitively send updated state information 321, 331, 341, and 351. For example, nodes 320, 330, 340, 350 can re-send updated state information 321, 331, 341, and 351 at update intervals. Example update intervals can comprise, e.g., 10 millisecond (ms) to 20 minute intervals. The RIC 310 can store updated state information 321, 331, 341, and 351 in the node state information data store 318. The RIC 310 can overwrite previously received state information, or the RIC 310 can optionally keep historical state information in order to facilitate predictions of future node states. Such predictions can optionally be used in place of received node state information in some embodiments.

Network dual-connectivity manager 315 can be configured to use state information 321, 331, 341, and 351, optionally along with other network information as appropriate, to calculate dual-connectivity instructions 322, 332, 342, 352 for the nodes 320, 330, 340, 350. The dual-connectivity instructions 322, 332, 342, 352 can comprise instructions usable at the nodes 320, 330, 340, 350 in connection with determining which other nodes to cooperate with in dual-connectivity relationships. The dual-connectivity instructions 322, 332, 342, 352 can comprise any of a variety of different types of instructions, depending on node type and desired implementation, according to this disclosure.

In an example embodiment according to FIG. 3, UE 302 can be in a single connected state with node 330, similar to the single connected 222 state illustrated in FIG. 2. In this example, node 330 is a first type node, such as an eNB type node. UE 302 can send and receive network communications 304 via node 330. The network communications 304 can comprise, inter alia, signal strength measurements of signals between UE 302 and second type nodes, e.g., nodes 340 and 350, which can be, e.g., gNB type nodes.

In order to determine, by node 330, which of nodes 340, 350 to select for dual-connectivity on behalf of UE 302, the node 330 can optionally send a dual-connectivity inquiry 335 to the RIC 310. In response to the dual-connectivity inquiry 335, the network dual-connectivity manager 315 can determine, at least in part based on node state information in the node state information data store 318, which of nodes 340, 350 to select for dual-connectivity on behalf of UE 302. The network dual-connectivity manager 315 can also use other information, such as the UE 302 signal strength measurements, for dual-connectivity node selection.

The RIC 310 can encode a network dual-connectivity manager 315 node selection, e.g., a selection of node 350, in a dual-connectivity instruction 332, and RIC 310 can send the dual-connectivity instruction 332 to node 330.

In response to receiving the dual-connectivity instruction 332, the node 330 can implement the dual-connectivity instruction 332 by sending a dual-connectivity request 375 to the node 350 indicated in the dual-connectivity instruction 332. The node 350 can grant the dual-connectivity request 375, thereby entering a dual-connectivity relationship with node 330 for the purpose of serving UE 302. Once the dual-connectivity relationship is established, the UE 302 can send and receive network communications 306 via node 350, in addition to any network communications 304 sent via node 330.

In the above example, note that by using RIC 310 in connection with dual-connectivity node selection, the network is enabled perform node selection intelligently, that is, in view of node state information that is not necessarily available at node 330 or node 350. For instance, UE 302 may report stronger signal strength associated with node 340 than with node 350. However, node state information 321, 331, 341, 351 reported to RIC 310 may indicate that the signal strengths are both acceptable, and node 340 is experiencing more load that node 350. Based on this node state information, the dual-connectivity manager 315 can select node 350 for dual-connectivity with node 330. Without the involvement of RIC 310, the node 330 may have otherwise selected node 340, thereby exacerbating a load imbalance between nodes 340 and 350.

Additional embodiments are described in connection with FIGS. 4 and 5. These additional embodiments comprise, for example, an embodiment in which the result achieved in the above example embodiment according to FIG. 3, namely, selection of node 350 for dual-connectivity with node 330, can be achieved via the dual-connectivity instruction 342 to node 340. The dual-connectivity instruction 342 can instruct node 340 to decline a dual-connectivity request from node 330, thereby causing node 330 to attempt dual-connectivity with another node, namely, node 350.

In another example embodiment, dual-connectivity inquiries such as dual-connectivity inquiry 335 can be eliminated. Instead, the RIC 310 can supply dual-connectivity instructions 322, 332, 342, 352 to nodes 320, 330, 340, 350, wherein the dual-connectivity instructions 322, 332, 342, 352 can be used in connection with subsequent dual-connectivity determinations at the nodes 320, 330, 340, 350 (subsequent to receiving dual-connectivity instructions 322, 332, 342, 352). Here, the term, "dual-connectivity determinations" comprises determinations of nodes to which nodes 320, 330, 340, 450 can send dual-connectivity requests, as well as, for nodes receiving dual-connectivity requests, determinations of which requests to grant and which requests to decline, based on the node from which the request was received. The dual-connectivity instructions 322, 332, 342, 352 supplied to nodes 320, 330, 340, 350 can be updated from time to time, based on updated state information 321, 331, 341, 351 received at RIC 310.

In further example embodiments, the dual-connectivity instructions 322, 332, 342, 352 can comprise selection policies applicable at nodes 320, 330, 340, 350. For example, a dual-connectivity instruction 322 can comprise a selection policy such as, "send 75% of dual-connectivity requests to node 340, and 25% of dual-connectivity requests to node 350." Such a selection policy designates a fractions of dual-connectivity relationships associated with potential dual-connectivity partners. Similarly, a dual-connectivity instruction 342 can comprise, "grant 75% of dual-connectivity requests from node 320, and grant 25% of dual-connectivity requests from node 330." A wide variety of other policies are possible. For example, a selection policy can specify how aggressively to request dual-connectivity with other nodes by specifying how many dual-connectivity requests to send per time interval.

Figure 4:
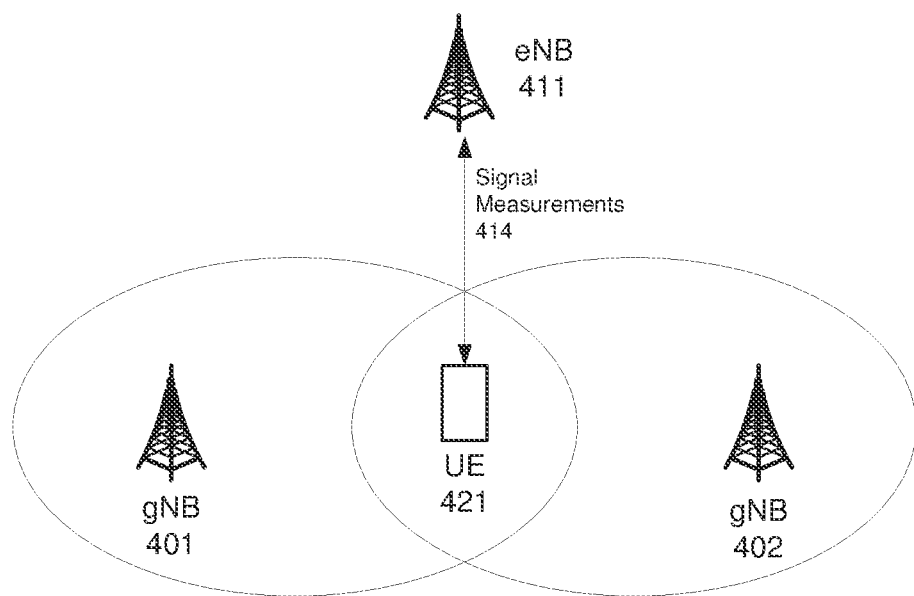
FIG. 4 illustrates a first example situation in which the disclosed intelligent dual-connectivity techniques can be deployed, in accordance with various aspects and embodiments of the subject disclosure.

FIG. 4 illustrates a first example situation in which the disclosed intelligent dual-connectivity techniques can be deployed, in accordance with various aspects and embodiments of the subject disclosure. FIG. 4 includes a UE 421, a network node of a first type, namely, eNB 411, and two network nodes of a second type, namely, gNB 401 and gNB 402. The UE 421 is connected to eNB 411, and the UE 421 is also located within service areas of gNB 401 and gNB 402. The UE 421 is able to measure signal strengths between UE 421 and gNB 401, as well as between UE 421 and gNB 402. The UE 421 can report signal strength measurements to the eNB 411, e.g., as signal measurements 414. The signal measurements can comprise, e.g., B1 measurements and/or reference signal received power (RSRP) measurements.

In a scenario such as illustrated in FIG. 4, the network comprising eNB 411 and gNBs 401, 402, can optionally support dual-connectivity of the UE 421, in which UE 421 remains connected with eNB 411, while a connection between UE 421 and either gNB 401 or gNB 402 is also established. Embodiments of this disclosure can provide techniques for intelligently selecting which of the gNBs, gNB 401 or gNB 402, to include in dual-connectivity network support of UE 421.

In an example according to FIG. 4, signal strengths associated with both gNB 401 and gNB 402 can be included in signal measurements 414. The signal strength associated with gNB 401 can be, e.g., stronger than the signal strength associated with gNB 402. However, state information reported by the gNBs 401, 402 to a controller (such as RIC 310 illustrated in FIG. 3) can indicate less available resource (e.g., due to a higher load) at gNB 401 than at gNB 402. As a result, the UE 421 can have better overall throughput if UE 421 enters dual-connectivity with gNB 402. Note however, that if eNB 411 were to select a gNB node based on its available information, namely, signal measurements 414, without support from a RIC 310, then the eNB 411 would select gNB 401, resulting in a sub-optimal dual-connectivity solution. However, if the eNB 411 can operate in accordance with a dual-connectivity instruction received from a RIC 310, as illustrated in FIG. 3, then the eNB 411 can make an improved gNB selection of gNB 402.

In an example solution, with an extension to an EN-DC E2 service model (E2SM) interface, the RIC 310 can influence the accept/reject decision at gNBs 401, 402 in response to a gNB addition request from eNB 411. For example, RIC 310 can provide a dual-connectivity instruction to gNB 401, causing gNB 401 to reject a dual-connectivity request from eNB 411. Such a rejection can cause the eNB 411 to select the next gNB in a gNB candidate list that is ranked by signal measurements 414. For example, eNB 411 can select gNB 402, eNB 411 can send a dual-connectivity request to gNB 402, and subsequently eNB 411 can enter a dual-connectivity relationship with gNB 402 in order to support UE 421.

Figure 5:
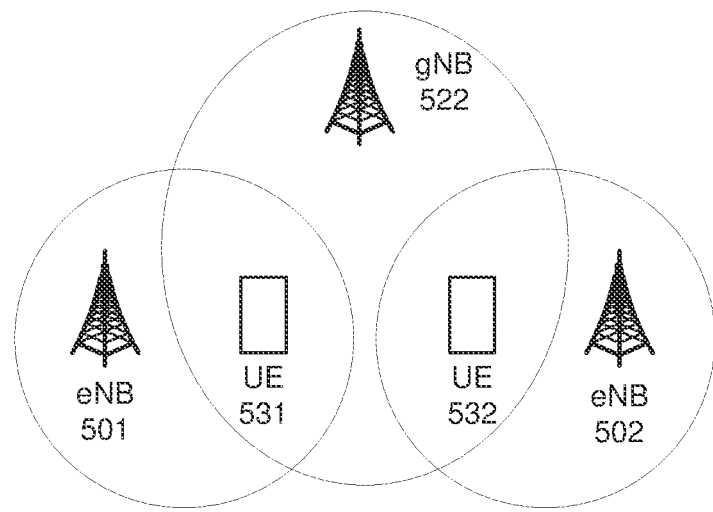
FIG. 5 illustrates a second example situation in which the disclosed intelligent dual-connectivity techniques can be deployed, in accordance with various aspects and embodiments of the subject disclosure.

FIG. 5 illustrates a second example situation in which the disclosed intelligent dual-connectivity techniques can be deployed, in accordance with various aspects and embodiments of the subject disclosure. FIG. 5 includes a first UE 531 and a second UE 532, eNB 501, eNB 502, and gNB 522. The eNBs 501 and 502 are example network nodes of a first type, and the gNB 522 is an example network node of a second type. The UE 531 is illustrated as located within the service areas of eNB 501 as well as gNB 522, and the UE 532 is illustrated as located within the service areas of eNB 502 as well as gNB 522.

In a scenario such as illustrated in FIG. 5, the network comprising eNBs 501, 502 and gNB 522, can optionally support dual-connectivity of the UEs 531, 532, in which each of the respective UEs 531, 532 remain connected with a respective eNB 501, 502, while connections between UEs 531, 532 and gNB 522 can also be established. Embodiments of this disclosure can provide techniques for intelligently selecting which of the UEs 531, 532 to prioritize for a dual-connectivity connection with gNB 522.

In an example according to FIG. 5, state information reported by the eNBs 501, 502 to a controller (such as RIC 310 illustrated in FIG. 3) can indicate less available resource (e.g., a higher load) at eNB 501 than at eNB 502. As a result, the illustrated network can have better overall load balance if UE 531 enters dual-connectivity with gNB 522. Note however, that if gNB 522 were to grant dual-connectivity requests without support from a RIC 310, then the gNB 522 could enter dual-connectivity with UE 532, potentially at the expense of dual-connectivity with UE 531, resulting in a sub-optimal dual-connectivity solution. However, if the gNB 522 can operate in accordance with a dual-connectivity instruction received from a RIC 310, as illustrated in FIG. 3, then the gNB 522 can make an improved determination of whether to grant dual-connectivity requests from eNB 501 and eNB 502.

In an example solution, the RIC 310 can provide an instruction to gNB 522 to selectively accept dual-connectivity requests from eNB s, based on a source of the dual-connectivity requests—that is, based on whether a request originates from eNB 501 or eNB 502. In a first embodiment, the RIC 310 can provide gNB 522 with an instruction, such as an "E2 insert control" instruction, in response to a gNB addition request. The instruction can instruct the gNB regarding whether to grant or deny a dual-connectivity request from eNB 501 and/or eNB 502. In a second embodiment, the RIC 310 can provide gNB 522 with an instruction comprising a policy, such as an "E2 policy" which specifies whether to accept dual-connectivity requests, or specifies how many dual-connectivity requests to accept, from different eNB sources such as eNB 501 and eNB 502.

With reference to FIG. 3, FIG. 4 and FIG. 5, it can be appreciated that a central controller, such as RIC 310, can be configured to provide instructions to eNBs and/or gNBs in connection with embodiments of this disclosure. In embodiments wherein the RIC 310 provides instructions to eNBs, and in a scenario such as illustrated in FIG. 4, the RIC 310 can instruct an eNB 411 to send a dual-connectivity request to a 'best gNB candidate' among a set of gNBs 401, 402. In further embodiments wherein the RIC 310 provides instructions to eNBs, and in a scenario such as illustrated in FIG. 5, the RIC 310 can instruct eNBs 501, 502 whether, or how aggressively, to send dual-connectivity requests to the gNB 522.

In embodiments wherein the RIC 310 provides instructions to incoming gNBs which accept/reject dual-connectivity requests, the RIC 310 need not influence the initiating eNB nodes. In scenarios illustrated in FIG. 4 and FIG. 5, the RIC 310 can instruct a gNB to grant or deny received dual-connectivity requests. When the RIC 310 instructs a gNB to reject a dual-connectivity request, the requesting eNB node can responsively continue to request dual-connectivity from a next gNB.

In embodiments wherein the RIC 310 provides dual-connectivity policy instructions to eNBs and/or gNBs, the policy can be updated periodically or as needed. The RIC 310 can be configured to provide policy to an eNB to influence its target gNB selection criteria, and the eNB can be configured to make a final decision regarding a gNB target based on the policy. Furthermore, the RIC 310 can be configured to provide policy to a gNB to influence its acceptance criteria, for example, based on the source eNB of a dual-connectivity request.

Figure 6:
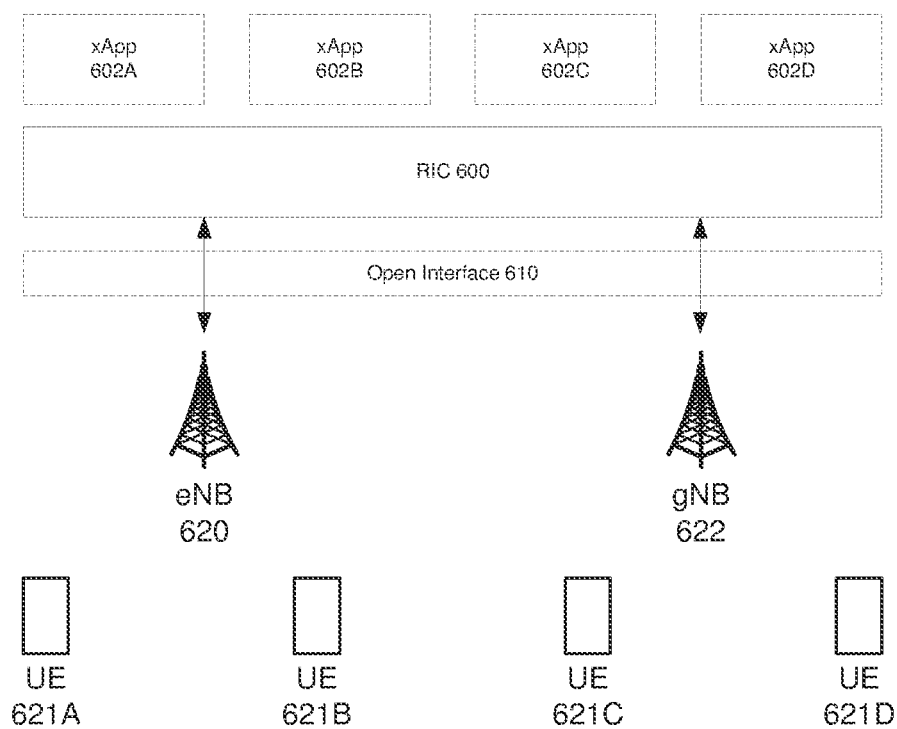
FIG. 6 illustrates an example radio access network intelligent controller architecture, in accordance with various aspects and embodiments of the subject disclosure.

FIG. 6 illustrates an example radio access network intelligent controller architecture, in accordance with various aspects and embodiments of the subject disclosure. FIG. 6 comprises RIC 600, xApps 602A, 602B, 602C, 602D, open interface 610, eNB 620, gNB 622, and UEs 621A, 621B, 621C, and 621D. The RIC 600 can implement a RIC 310, the eNB 620 and gNB 622 can implement the various other eNBs and gNBs illustrated herein, and the UEs 621A, 621B, 621C, and 621D can implement the various other UEs illustrated herein. The proposed solutions herein, namely, processes configured to provide dual-connectivity instructions to nodes 620 and 622, can optionally be realized as one or more of xApps 602A, 602B, 602C, 602D running on the RIC 600. The RIC 600 can be configured to provide close-loop control to eNB 620 and/or gNB 622 via an open interface 610, e.g., an E2 interface.

Figure 7:
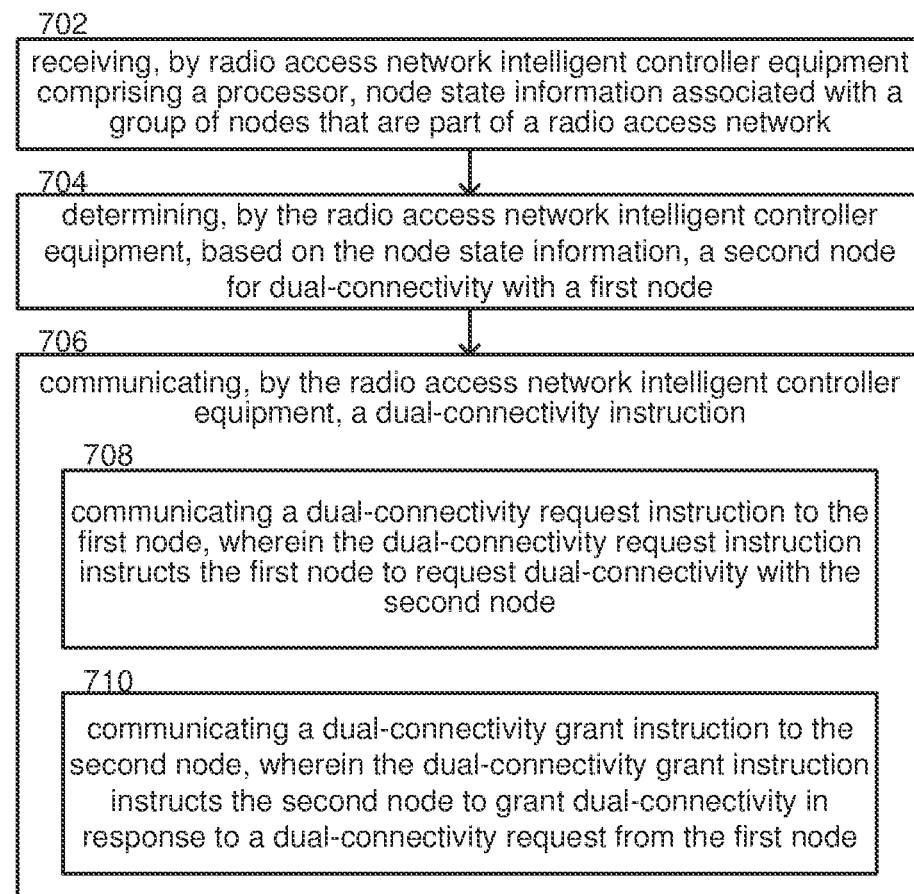
FIG. 7 is a flow diagram representing example operations of radio access network intelligent controller equipment, in accordance with various aspects and embodiments of the subject disclosure.

FIG. 7 is a flow diagram representing example operations of radio access network intelligent controller equipment, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by a RIC 310, illustrated in FIG. 3. Example operation 702 comprises receiving, by radio access network intelligent controller equipment comprising a processor, node state information associated with a group of nodes that are part of a radio access network. For example, RIC 310 can receive state information 321, 331, 341, and 351, as illustrated in FIG. 3. The node state information can comprise load information comprising, for example, respective current loads, that is, loads at a present or near-present time, at respective nodes 320, 330, 340, and 350. The node state information can optionally further comprise additional state information, such as signal strength information comprising respective current, or substantially current signal strengths between a user equipment 302 and respective nodes of the group of nodes 320, 330, 340, and 350.

In FIG. 3, the group of nodes 320, 330, 340, and 350 comprises first nodes having a first node type, e.g., nodes 320 and 330 which can comprise eNBs, and second nodes having a second node type, e.g., nodes 340 and 350 which can comprise gNBs. The second nodes 340, 350 can be configured to determine whether to grant dual-connectivity requests, such as DC request 375, initiated by the first nodes 320, 330.

Example operation 704 comprises determining, by the radio access network intelligent controller equipment, based on the node state information, a second node of the second nodes for dual-connectivity with a first node of the first nodes. For example, RIC 310 can determine, based on the node state information 321, 331, 341, and 351, a second node 340 or 350 of the second nodes 340, 350 for dual-connectivity with a first node 330 of the first nodes 320, 330. The determining can comprise, e.g., selecting the second node 340 or 350 of the second nodes 340, 350 based on a determination that the second node 340 or 350 is able to facilitate a reduction in a load imbalance among the second nodes 340, 350. For example, if node 340 has a relatively higher load and node 350 has a relatively lower load, selection of node 350 would facilitate a reduction in the load imbalance.

Example operation 706 comprises communicating, by the radio access network intelligent controller equipment, a dual-connectivity instruction. For example, RIC 310 can communicate any of DC instructions 322, 332, 342, and/or 352 to any of nodes 320, 330, 340, and/or 350. Blocks 706 and 708 illustrate two example dual-connectivity instructions.

Operation 708 represents communicating a dual-connectivity request instruction to the first node, wherein the dual-connectivity request instruction instructs the first node to request dual-connectivity with the second node. For example, the RIC 310 can communicate DC instruction 332 to first node 330, wherein the DC request instruction 332 instructs the first node 330 to request dual-connectivity with the second node 350. Conversely, the DC request instruction 332 can instruct the first node 330 to not request dual-connectivity with the second node 350, thereby causing the first node 330 to select a different second node.

Operation 710 represents communicating a dual-connectivity grant instruction to the second node, wherein the dual-connectivity grant instruction instructs the second node to grant dual-connectivity in response to a dual-connectivity request from the first node. For example, RIC 310 can communicate a dual-connectivity grant instruction, e.g., DC instruction 352, to the second node 350, wherein the dual-connectivity grant instruction 352 instructs the second node 350 to grant dual-connectivity in response to a dual-connectivity request 375 from the first node 330. Conversely, the DC instruction 352 can instruct a second node 350 to deny a dual-connectivity request, thereby causing the first node 330 to request dual-connectivity with a different second node such as node 340.

Figure 8:
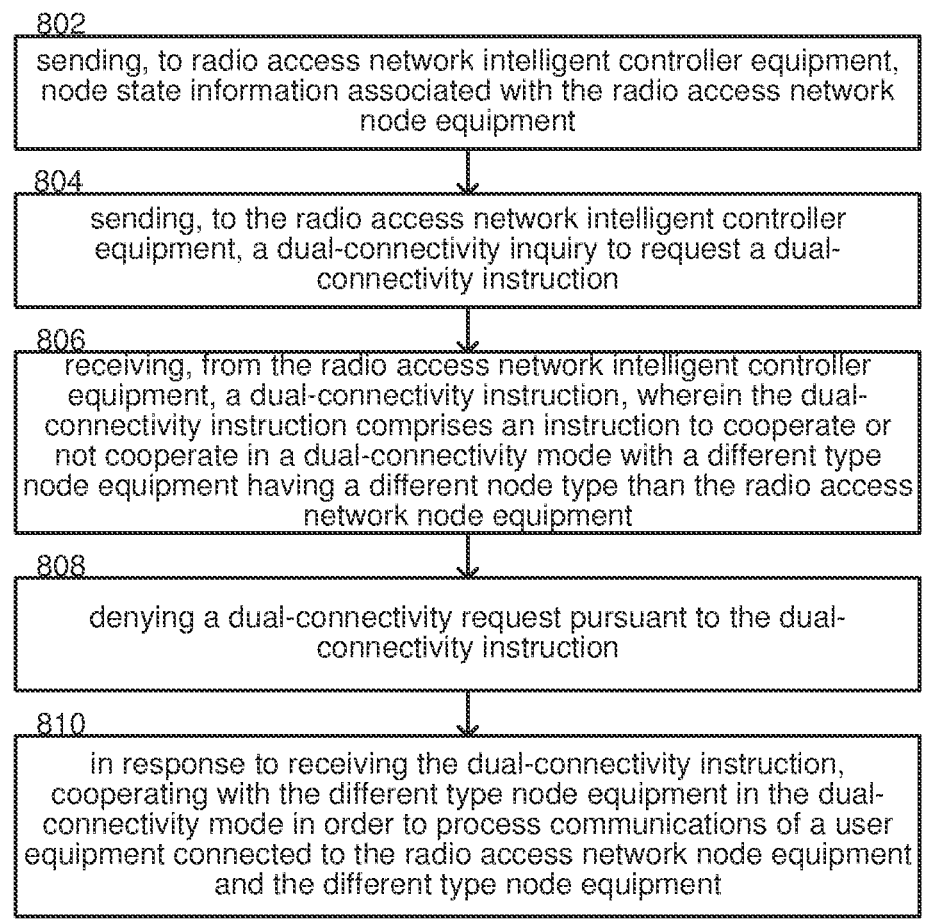
FIG. 8 is a flow diagram representing example operations of radio access network equipment, in accordance with various aspects and embodiments of the subject disclosure.

FIG. 8 is a flow diagram representing example operations of radio access network equipment, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by a node such as 320, 330, 340, or 350, illustrated in FIG. 3. Example operation 802 comprises sending, to radio access network intelligent controller equipment, node state information associated with the radio access network node equipment. For example, any of nodes 320, 330, 340, or 350 can send respective node state information 321, 331, 341, or 351, associated with the respective node 320, 330, 340, or 350, to the RIC 310.

Example operation 804 is an optional operation which need not be performed in all embodiments. A node 320, 330, 340, or 350 can send, to the RIC 310, a dual-connectivity inquiry to request a dual-connectivity instruction. For example, an eNB type node 320 or 330 can request a dual-connectivity instruction in order to determine a target gNB type node for a dual-connectivity request. Alternatively, a gNB type node 340 or 350 can request a dual-connectivity instruction in order to determine whether to grant or deny dual-connectivity request(s) originating from eNB nodes. Sending a dual-connectivity inquiry can optionally be performed in order to establish dual-connectivity for a particular user equipment 302.

Example operation 806 comprises receiving, from the radio access network intelligent controller equipment, a dual-connectivity instruction, wherein the dual-connectivity instruction comprises an instruction to cooperate or not cooperate in a dual-connectivity mode with a different type node equipment having a different node type than the radio access network node equipment. For example, a node 320, 330, 340, or 350 can receive a dual-connectivity instruction 322, 332, 342, or 352 from the RIC 310. The dual-connectivity instruction can comprise an instruction to cooperate in a dual-connectivity mode with a different type node equipment, for example, by instructing an eNB node 330 to send a dual-connectivity request to a gNB node 350, or by instructing a gNB node 350 to grant a dual-connectivity request from an eNB node 330. The dual-connectivity instruction can alternatively comprise an instruction to not cooperate in a dual-connectivity mode with a different type node equipment, for example, by instructing an eNB node 330 not to send a dual-connectivity request to a gNB node 340, or by instructing a gNB node 340 to deny a dual-connectivity request from an eNB node 330.

For embodiments which do not employ a dual-connectivity inquiry pursuant to block 804, dual-connectivity instructions 322, 332, 342, 352 can be sent from the RIC 310 and received at nodes 320, 330, 340, 350 prior to establishing dual-connectivity for the user equipment 302. The dual-connectivity instructions 322, 332, 342, 352 can be used at nodes 320, 330, 340, 350 in order to establish dual-connectivity for the user equipment 302. Also, when an eNB sends a dual-connectivity inquiry to RIC 310 pursuant to block 804, the RIC 310 can optionally respond in part by sending a dual-connectivity instruction to a gNB, which will affect whether a subsequent dual-connectivity request to the gNB is granted or denied.

Example operation 808 comprises denying a dual-connectivity request pursuant to the dual-connectivity instruction. For example, a gNB type node 340 or 350 can receive a prior dual-connectivity request from a third node equipment such as node 320, prior to receiving a subsequent dual-connectivity request 375 from a first node 330. The dual-connectivity instruction received pursuant to block 806 can comprise an instruction not to cooperate in dual-connectivity mode with third node equipment 320. By denying a request from third node equipment 320, the third node equipment 320 can be caused to request dual-connectivity with a different gNB node. Furthermore, by denying a request from third node equipment 320, a gNB 340, 350 can be better equipped to grant a subsequent request from a different node, such as node 330.

Example operation 810 comprises, in response to receiving the dual-connectivity instruction, cooperating with the different type node equipment in the dual-connectivity mode in order to process communications of a user equipment connected to the radio access network node equipment and the different type node equipment. For example, in response to receiving the dual-connectivity instruction 332, node 330 can cooperate with the node 350 in the dual-connectivity mode in order to process communications of user equipment 302 connected to the node 330 and the different type node equipment 350. The cooperating can comprise, e.g., sending a dual-connectivity request 375 to the different type node equipment 350.

In another example, in response to receiving the dual-connectivity instruction 352, node 350 can cooperate with the different type node equipment 330, in the dual-connectivity mode in order to process communications of user equipment 302 connected to the node 350 and the different type node equipment 330. The cooperating can comprise, e.g., granting a dual-connectivity request 375 received from the different type node equipment 330.

Figure 9:
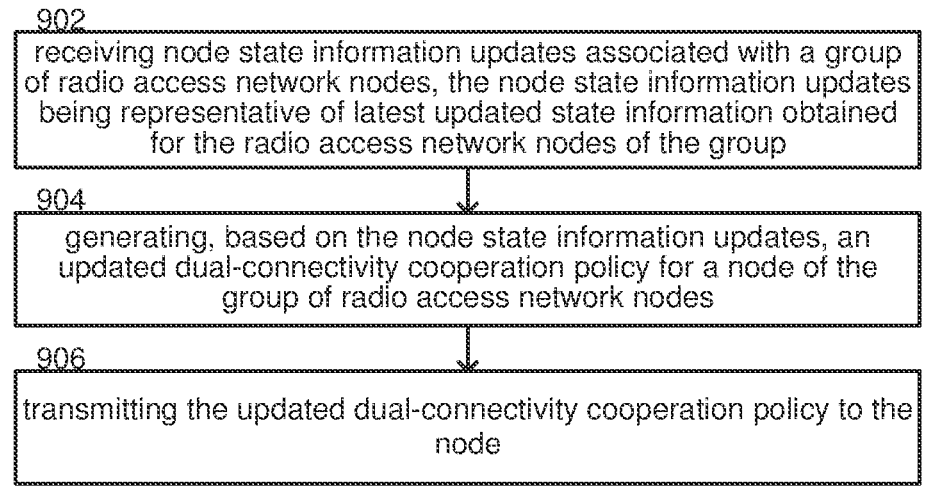
FIG. 9 is a flow diagram representing another set of example operations of radio access network intelligent controller equipment, in accordance with various aspects and embodiments of the subject disclosure.

FIG. 9 is a flow diagram representing another set of example operations of radio access network intelligent controller equipment, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by a RIC 310, illustrated in FIG. 3. Example operation 902 comprises receiving node state information updates associated with a group of radio access network nodes, the node state information updates being representative of latest updated state information obtained for the radio access network nodes of the group. For example, RIC 310 can be configured to receive node state information updates in the form of state information 321, 331, 341, 351, the node state information updates 321, 331, 341, 351 being associated with a group of radio access network nodes 320, 330, 340, 350, and the node state information updates 321, 331, 341, 351 being representative of latest updated state information obtained for the radio access network nodes 320, 330, 340, 350.

In some embodiments, the node state information updates 321, 331, 341, 351 can comprise load information. The load information can comprise a substantially current, that is, a presently existing, load corresponding to at least one radio access network node 320, 330, 340, or 350 of the radio access network nodes of the group.

The group of radio access network nodes 320, 330, 340, 350 can comprise first nodes having a first node type, such as eNBs, and second nodes having a second node type, such as gNBs. The second nodes, e.g., gNBs 340 and 350, can be configured to determine whether to grant or deny dual-connectivity requests initiated by the first nodes, e.g., eNBs 320 and 330.

Example operation 904 comprises generating, based on the node state information updates, an updated dual-connectivity cooperation policy for a node, e.g., for node 320, 330, 340, and/or 350 of the group of radio access network nodes 320, 330, 340, 350. The updated dual-connectivity cooperation policy can control dual-connectivity request handling by the node 320, 330, 340, and/or 350. When the dual-connectivity cooperation policy is for a node among the first nodes, e.g., node 320 or node 330, the updated dual-connectivity cooperation policy can be applicable by the node 320, 330 to select a second node of the second nodes 340, 350 as a target for a dual-connectivity request. Conversely, when the dual-connectivity cooperation policy is for a node among the second nodes, e.g., node 340 or node 350, the updated dual-connectivity cooperation policy can be applicable by the node 340, 350 to determine whether to grant or deny a received dual-connectivity request based on a source, e.g., node 320 or node 330, of the received dual-connectivity request.

In some embodiments, the updated dual-connectivity cooperation policy can bias the node 320, 330, 340, and/or 350 towards an increased probability of cooperating with at least one identified other node among the group of radio access network nodes 320, 330, 340, 350 to establish dual-connectivity on behalf of a user equipment 302. Furthermore, in some embodiments, implementation of the updated dual-connectivity cooperation policy can reduce a load imbalance among the group of nodes 320, 330, 340, 350.

Example operation 904 comprises transmitting the updated dual-connectivity cooperation policy to the node. For example, the RIC 310 can transmit the updated dual-connectivity cooperation policy to the node 320, 330, 340, and/or 350, namely, to the node for which the updated dual-connectivity cooperation policy was generated.

Figure 10:
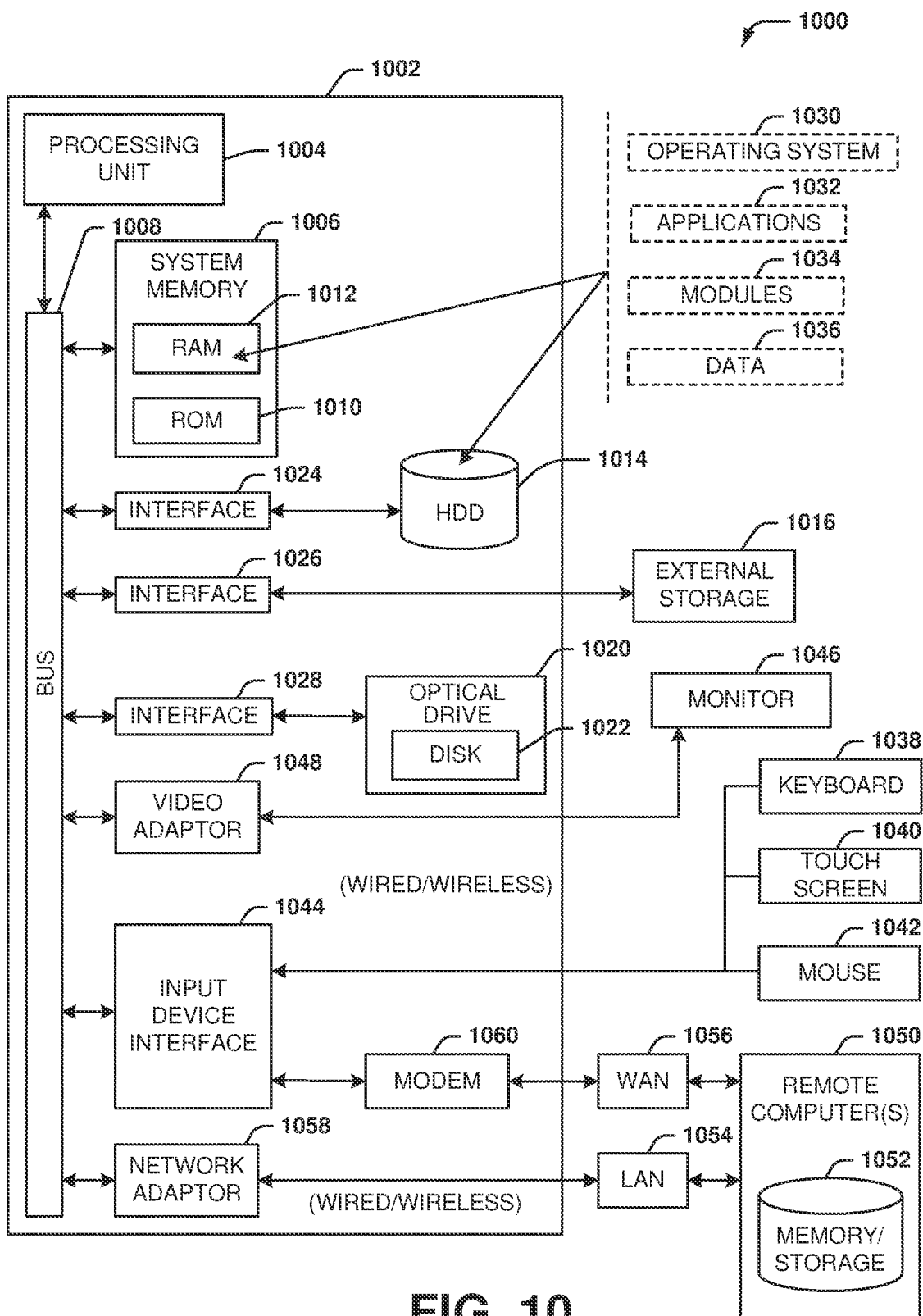
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various network equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by network equipment comprising a processor, node state information associated with a group of nodes, wherein the node state information comprises traffic load information, wherein the traffic load information comprises respective current traffic loads at respective nodes of the group of nodes, and wherein the group of nodes comprise a first group of nodes and a second group of nodes;
based on the node state information, determining, by the network equipment, a first node of the first group of nodes for dual-connectivity with a second node of the second group of nodes; and
facilitating, by the network equipment, a first transmission of a first dual-connectivity instruction to the first node, and a second transmission of a second dual-connectivity instruction to the second node.

2. The method of claim 1, wherein the node state information further comprises signal strength information that comprises respective current signal strengths between a user equipment and respective nodes of the group of nodes.

3. The method of claim 1, wherein the determining comprises selecting the first node based on the first node being determined to facilitate a reduction in a load imbalance among first nodes of the first group of nodes.

4. The method of claim 1, wherein the first dual-connectivity instruction comprises a dual-connectivity grant instruction, and wherein the second dual-connectivity instruction comprises a dual-connectivity request instruction.

5. The method of claim 4, wherein the dual-connectivity grant instruction provides a first indication to the first node to grant dual-connectivity in response to receipt of a dual-connectivity request from the second node, and wherein the dual-connectivity request instruction provides a second indication to the second node to request dual-connectivity with the first node.

6. The method of claim 1, wherein the first dual-connectivity instruction and the second dual-connectivity instruction comprise respective instructions not to cooperate in a dual-connectivity mode with a third node.

7. The method of claim 1, wherein the first group of nodes comprise first nodes, comprising the first node, having a first node type, and wherein the second group of nodes comprise second nodes, comprising the second node, having a second node type.

8. The method of claim 7, wherein the first node type is a next generation node B type, and wherein the second node type is an evolved node B type.

9. The method of claim 1, wherein the first group of nodes are configured to determine whether to grant dual-connectivity requests initiated by the second group of nodes.

10. First network node equipment, comprising:
a processor; and
a memory that stores executable instructions that, when executed by the processor, facilitate performance of operations, comprising:
receiving network load information that is indicative respective current network loads being experienced at respective nodes of a group of nodes, and wherein the respective nodes comprise at least a first node of a group of first nodes and at least a second node of a group of second nodes; and
based on the receiving, selecting the first node for dual-connectivity with the second node;
sending, to the first node, a first dual-connectivity instruction that comprises a dual-connectivity grant instruction; and
sending, to the second node, a second dual-connectivity instruction that comprises a dual-connectivity request instruction.

11. The first network node equipment of claim 10, wherein the selecting comprises selecting the first node based on the first node being determined to facilitate a reduction in a network load imbalance among first nodes of the group of first nodes.

12. The first network node equipment of claim 10, wherein the receiving further comprises receiving signal strength information that comprises respective current signal strengths between a user equipment and respective nodes of the group of nodes.

13. The first network node equipment of claim 10, wherein the dual-connectivity grant instruction provides a first indication to the first node to grant dual-connectivity in response to receipt of a dual-connectivity request from the second node, and wherein the dual-connectivity request instruction provides a second indication to the second node to request dual-connectivity with the first node.

14. The first network node equipment of claim 10, wherein the first dual-connectivity instruction and the second dual-connectivity instruction comprise respective instructions not to cooperate in a dual-connectivity mode with a third node.

15. The first network node equipment of claim 10, wherein the group of first nodes comprise first nodes, comprising the first node, having a first node type, and wherein the group of second nodes comprise second nodes, comprising the second node, having a second node type.

16. A non-transitory machine-readable medium, comprising executable instructions that, when executed by a processor of first network node equipment, facilitate performance of operations, comprising:
sending, to network intelligent controller equipment, node state information associated with the first network node equipment and a dual-connectivity inquiry to request a dual-connectivity instruction for establishment of dual-connectivity for a user equipment; and
based on the dual-connectivity instruction received in response to the sending, cooperating with second network node equipment in a dual-connectivity mode, wherein the cooperating facilitates processing of communications for the user equipment.

17. The non-transitory machine-readable medium of claim 16, wherein the node state information comprises network traffic load information that comprises respective current network traffic loads at respective network node equipment, comprising the first network node equipment and the second network node equipment.

18. The non-transitory machine-readable medium of claim 16, wherein the cooperating comprises sending, to the second network node equipment, a dual-connectivity request.

19. The non-transitory machine-readable medium of claim 16, wherein the cooperating comprises granting a dual-connectivity request received from the second network node equipment.

20. The non-transitory machine-readable medium of claim 16, wherein the first network node equipment is a first node type, and wherein the second network node equipment is a second node type different from the first node type.

* * * * *